(12) United States Patent
Patel

(10) Patent No.: US 7,653,349 B1
(45) Date of Patent: Jan. 26, 2010

(54) ADAPTIVE RETURN LINK FOR TWO-WAY SATELLITE COMMUNICATION SYSTEMS

(75) Inventor: Harish N. Patel, Huntington Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 779 days.

(21) Appl. No.: 10/464,113

(22) Filed: Jun. 18, 2003

(51) Int. Cl.
H04B 7/185 (2006.01)

(52) U.S. Cl. .............. 455/13.4; 455/13.1; 455/13.2; 455/69; 455/522; 455/340; 455/427; 455/430; 375/285; 375/295; 375/308; 342/457; 725/118; 725/124; 725/125; 370/316

(58) Field of Classification Search ............. 455/13.4, 455/13.2, 13.1, 12.1, 69, 522, 427, 340, 430; 375/285, 295, 308; 342/457, 258; 701/213, 701/214; 725/118, 124, 125; 370/316
See application file for complete search history.

(56) References Cited

U.S. PATENT DOCUMENTS

| | | | |
|---|---|---|---|
| 3,896,382 A | 7/1975 | Magenheim | |
| 4,004,224 A | 1/1977 | Arens et al. | |
| 4,207,431 A | 6/1980 | McVoy | |
| 4,301,533 A | 11/1981 | Acampora et al. | |
| 4,309,764 A | 1/1982 | Acampora | |
| 4,567,485 A | 1/1986 | Oshima et al. | |
| 4,776,035 A | 10/1988 | Duggan | |
| 4,837,580 A | 6/1989 | Frazita | |
| 4,837,786 A | 6/1989 | Gurantz et al. | |
| 4,888,596 A | 12/1989 | Conanan | |
| 4,896,369 A | 1/1990 | Adams, Jr. et al. | |
| 4,910,792 A | 3/1990 | Takahata et al. | |
| 4,941,199 A | 7/1990 | Saam | |
| 5,060,292 A | 10/1991 | Ayukawa et al. | |
| 5,081,713 A | 1/1992 | Miyazaki | |
| 5,204,970 A | 4/1993 | Stengel et al. | |
| 5,257,029 A | 10/1993 | Miyo | |
| 5,521,943 A * | 5/1996 | Dambacher | ................. 375/295 |
| 5,579,367 A | 11/1996 | Raymond et al. | |
| 5,666,648 A | 9/1997 | Stuart | |
| 5,691,980 A | 11/1997 | Welles et al. | |
| 5,758,260 A | 5/1998 | Wiedeman | |
| 5,793,813 A | 8/1998 | Cleave | |
| 5,798,731 A * | 8/1998 | Lesthievent | ............ 342/357.07 |
| 5,801,754 A | 9/1998 | Ruybal et al. | |
| 5,812,947 A | 9/1998 | Dent | |

(Continued)

Primary Examiner—Matthew D Anderson
Assistant Examiner—Shaima Q Aminzay

(57) ABSTRACT

A method and apparatus for adaptively transmitting an uplink signal comprising information from a ground station to a satellite is disclosed. The method comprises the steps of receiving a transmitted downlink signal at a ground station from the satellite; measuring the quality of the transmitted signal; computing a prediction of a degradation of the uplink signal using the quality of the received signal, and transmitting the uplink signal according to the predicted degradation of the uplink signal. The apparatus comprises a tuner for receiving a transmitted downlink signal from the satellite; a signal analyzer, communicatively coupled to the tuner, for measuring a characteristic of the received downlink signal; an uplink degradation estimation module, communicatively coupled to the signal analyzer, for estimating the degradation of the uplink signal from the received downlink signal characteristic; and a controller, communicatively coupled to the uplink degradation module, for controlling the transmission of the uplink signal according to the estimated degradation of the uplink signal.

30 Claims, 8 Drawing Sheets

U.S. PATENT DOCUMENTS

| | | | |
|---|---|---|---|
| 5,867,109 A | 2/1999 | Wiedeman | |
| 5,878,329 A | 3/1999 | Mallinckrodt | |
| 5,898,680 A | 4/1999 | Johnstone et al. | |
| 5,918,156 A | 6/1999 | Tanabe | |
| 5,949,766 A | 9/1999 | Ibanez-Meier et al. | |
| 5,956,619 A | 9/1999 | Gallagher et al. | |
| 5,959,984 A | 9/1999 | Dent | |
| 5,999,127 A | 12/1999 | Dezelan | |
| 6,002,422 A | 12/1999 | Mastenbrook | |
| 6,044,323 A | 3/2000 | Yee et al. | |
| 6,085,067 A | 7/2000 | Gallagher et al. | |
| 6,118,999 A | 9/2000 | Moraes et al. | |
| 6,125,261 A | 9/2000 | Anselmo et al. | |
| 6,141,534 A | 10/2000 | Snell et al. | |
| 6,151,308 A | 11/2000 | Ibanez-Meier et al. | |
| 6,173,178 B1 | 1/2001 | Hammill et al. | |
| 6,181,932 B1 | 1/2001 | Kolev et al. | |
| 6,212,360 B1 | 4/2001 | Fleming et al. | |
| 6,219,528 B1 | 4/2001 | Wright et al. | |
| 6,233,451 B1 | 5/2001 | Noerpel et al. | |
| 6,272,340 B1 | 8/2001 | Wright et al. | |
| 6,297,845 B1 | 10/2001 | Kuhn et al. | |
| 6,317,420 B1 | 11/2001 | Schiff | |
| 6,324,381 B1 | 11/2001 | Anselmo et al. | |
| 6,335,920 B1 | 1/2002 | Strodtbeck et al. | |
| 6,339,611 B1 | 1/2002 | Antonio et al. | |
| 6,366,776 B1 | 4/2002 | Wright et al. | |
| 6,385,773 B1 * | 5/2002 | Schwartzman et al. | 725/124 |
| 6,421,528 B1 | 7/2002 | Rosen et al. | |
| 6,430,394 B1 | 8/2002 | Boyden | |
| 6,466,569 B1 | 10/2002 | Wright et al. | |
| 6,473,858 B1 | 10/2002 | Shimomura et al. | |
| 6,493,538 B1 | 12/2002 | Jabbarnezhad | |
| 6,512,749 B1 | 1/2003 | Wright et al. | |
| 6,519,446 B2 | 2/2003 | Tawil et al. | |
| 6,526,575 B1 | 2/2003 | McCoy et al. | |
| 6,532,220 B1 * | 3/2003 | Carneal et al. | 370/329 |
| 6,580,452 B1 | 6/2003 | Gangitano | |
| 6,587,687 B1 | 7/2003 | Wiedeman | |
| 6,594,469 B1 | 7/2003 | Serri et al. | |
| 6,628,919 B1 | 9/2003 | Curello et al. | |
| 6,647,270 B1 | 11/2003 | Himmelstein | |
| 6,704,543 B1 | 3/2004 | Sharon et al. | |
| 6,724,737 B1 | 4/2004 | Boyden et al. | |
| 6,745,043 B1 | 6/2004 | Lester et al. | |
| 6,757,264 B1 * | 6/2004 | Gayrard | 370/316 |
| 6,763,006 B1 | 7/2004 | Lockett | |
| 6,813,476 B1 | 11/2004 | Brooker | |
| 6,813,485 B2 | 11/2004 | Sorrells et al. | |
| 6,834,180 B1 | 12/2004 | Marshall | |
| 6,836,650 B2 | 12/2004 | Sorrells et al. | |
| 6,842,437 B1 | 1/2005 | Heath | |
| 6,859,652 B2 * | 2/2005 | Karabinis et al. | 455/427 |
| 6,920,185 B2 | 7/2005 | Hinson | |
| 6,925,113 B2 | 8/2005 | Kim et al. | |
| 6,975,582 B1 | 12/2005 | Karabinis et al. | |
| 6,990,314 B1 | 1/2006 | Hagen et al. | |
| 7,043,200 B2 | 5/2006 | Andenæs | |
| 7,047,029 B1 | 5/2006 | Godwin et al. | |
| 7,408,892 B2 | 8/2008 | Dale et al. | |
| 2002/0041328 A1 | 4/2002 | LeCompte et al. | |
| 2002/0061073 A1 * | 5/2002 | Huang et al. | 375/295 |
| 2002/0066102 A1 | 5/2002 | Chapman et al. | |
| 2002/0146979 A1 | 10/2002 | Regulinski et al. | |
| 2002/0168974 A1 | 11/2002 | Rosen et al. | |
| 2003/0005437 A1 | 1/2003 | Feuer et al. | |
| 2003/0016634 A1 | 1/2003 | Freedman et al. | |
| 2003/0073435 A1 | 4/2003 | Thompson et al. | |
| 2003/0203733 A1 | 10/2003 | Sharon | |
| 2005/0020204 A1 | 1/2005 | Ducasse | |
| 2005/0037706 A1 | 2/2005 | Settle | |
| 2005/0141445 A1 * | 6/2005 | Dunas et al. | 370/316 |
| 2008/0088462 A1 | 4/2008 | Breed | |

\* cited by examiner

US 7,653,349 B1

ADAPTIVE RETURN LINK FOR TWO-WAY SATELLITE COMMUNICATION SYSTEMS

BACKGROUND OF THE INVENTION

1. Field of the Invention

This invention relates to systems and methods for improving a power and bandwidth constrained transmission system, and in particular to a system and method for adaptively varying an uplink signal from a terrestrially-based user terminal to a satellite according to a predicted degradation of the uplink signal.

2. Description of the Related Art

A typical communications system, whether terrestrial or satellite-based, is constrained in its transmission power and signal bandwidth. The communications system may also be required to deliver reliable communications to one point, as in a terrestrial microwave link, or to many points in a satellite broadcast system serving the United States.

A typical satellite communications system is typically designed such that all signals transmitted to and received from terrestrially based receivers have a minimum carrier to noise ratio (CNR). The CNR of the received signal is a function of a number of parameters, including the power of the signal transmitted and signal propagation characteristics such as atmospheric attenuation. Unfortunately, at the wavelengths typically used in satellite-home communications systems, rain and other sources of atmospheric attenuation have a significant effect upon the CNR. Hence, during heavy rain, subscribers can experience degraded signal quality in both transmitted and received signals.

In the past, system designers have assured a minimum signal quality is provided by designing transmitters, power systems, and related components to produce sufficient power to assure a minimum CNR in all conditions, even when compromised by unfavorable atmospheric attenuation characteristics. Unfortunately, the amount of attenuation from rain and similar atmospheric parameters can be substantial and widely varying. Hence, to achieve the desired CNR at all times (including intense rain periods) this solution requires that the ground and satellite transmitters, power system and related components be designed for high performance levels that are not needed most of the time.

Setting the transmitter power to a level that results in a sufficient CNR for all conditions (or nearly all conditions) may be economically impractical, and is typically infeasible in existing field units. What is needed is a system and method for adaptively controlling transmissions to account for signal propagation characteristics. The present invention satisfies that need.

SUMMARY OF THE INVENTION

To address the requirements described above, the present invention discloses a method, apparatus, and article of manufacture for adaptively transmitting an uplink signal comprising information from a ground station to a satellite. The method comprises the steps of receiving a transmitted downlink signal at a ground station from the satellite; measuring the quality of the transmitted signal; computing a prediction of a degradation of the uplink signal using the quality of the received signal, and transmitting the uplink signal according to the predicted degradation of the uplink signal.

The apparatus comprises a tuner for receiving a transmitted downlink signal from the satellite; a signal analyzer, communicatively coupled to the tuner, for measuring a characteristic of the received downlink signal; an uplink degradation estimation module, communicatively coupled to the signal analyzer, for estimating the degradation of the uplink signal from the received downlink signal characteristic; and a controller, communicatively coupled to the uplink degradation module, for controlling the transmission of the uplink signal according to the estimated degradation of the uplink signal.

The invention allows a predetermined successful communications link to a satellite using the subscriber's ODU. This is accomplished using an existing or modified power meter in the IRD to measure the downlink attenuation (typically due to weather), and to use the downlink attenuation to compute the expected uplink (from the subscriber to the satellite) degradation. If the degradation of the uplink signal is minimal, but enough to preclude normal transmission at acceptable error rates, the IRD transmits the data with a different transmission characteristic (e.g. lower transmission rate, different modulation scheme, higher power, or different error correction) to ensure successful transmission. If the degradation is sufficient to essentially preclude transmission, and the uplink cannot be established in the near future, the IRD stores the information, informs the subscriber that the uplink information will not be transmitted, continues to predict the uplink degradation from subsequent downlinks (e.g. every 5 minutes), and informs the subscriber when the uplink can commence. If the predicted degradation is between these two extremes, the IRD stores the information, informs the subscriber that the uplink will be delayed, and continues to predict the uplink degradation from subsequent downlinks. When the predicted degradation improves sufficiently to allow transmission, the information is uplinked to the satellite.

This allows the IRD to pre-determine the success of a message transmitted from the subscriber to the satellite. The signal degradations measured by the IRD can include degradations caused by weather, misalignment of the ODU, or reduced ODU or IRD performance from hardware or software malfunctions.

The present invention applies to a variety of terrestrial and satellite applications, but is especially advantageous in satellite distribution systems.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
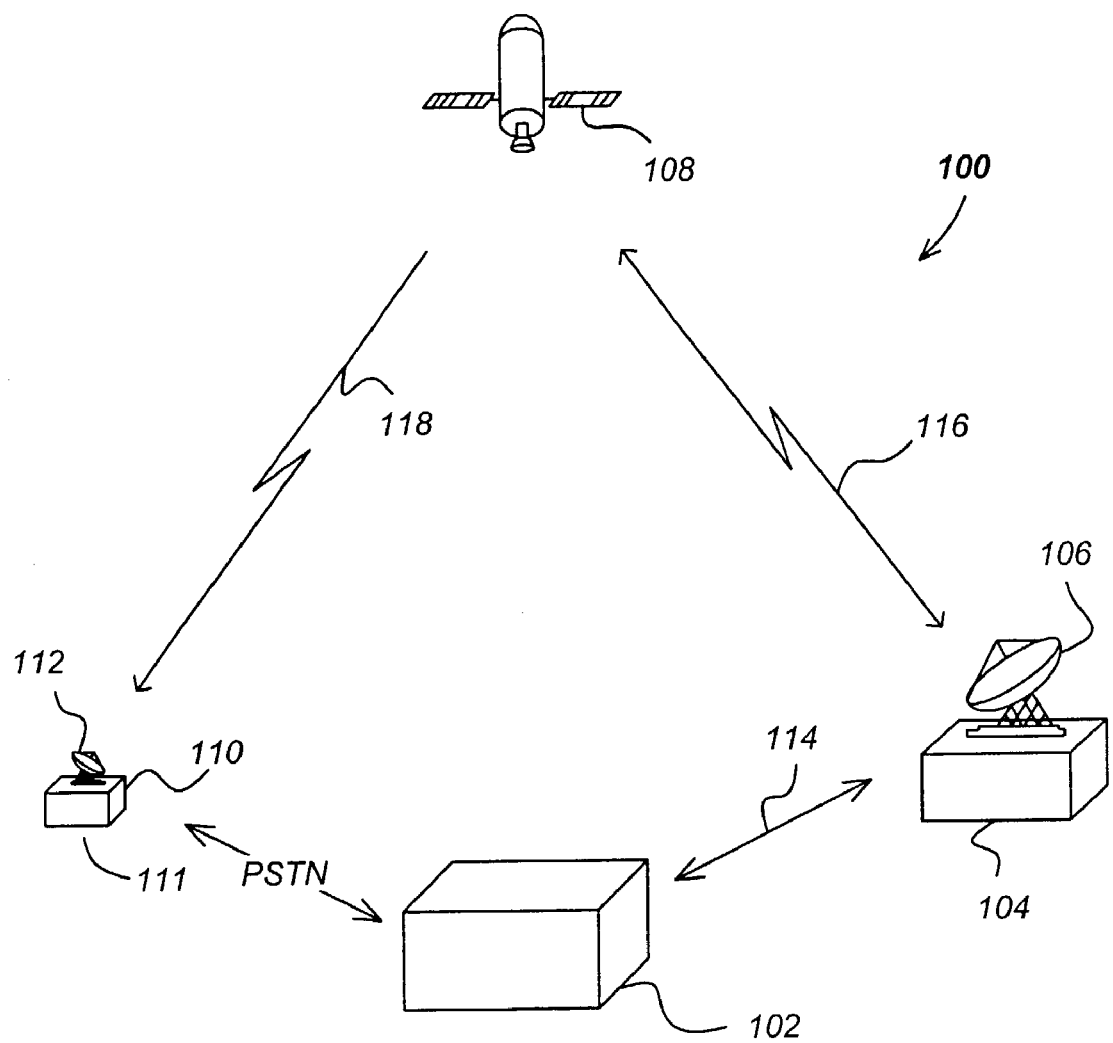
FIG. 1 is a block diagram illustrating an overview of a video distribution system.

FIG. 1 is a diagram illustrating an overview of a multi-channel video distribution system 100. The video distribution system 100 comprises a control center 102, an uplink center 104, a satellite 108, and a ground station 111 having a terrestrial receiver 112 and a subscriber 110.

The uplink center 104 receives program material from external sources or the control center 102 via a communications link 114. In accordance with instructions from the control center 102, the uplink center 104 transmits the program material and program control information to the satellite 108 via uplink 116 using the uplink antenna 106. The satellite 108 receives and transmits the video programs and control information to the subscriber via downlink transmission signal 118. The subscriber 110 receives this information using the terrestrial receiver 112. The ground station 111 also comprises device having a transmitter and a transmit antenna for sending data to the satellite 108. The satellite 108 communicates information received from the ground station to the uplink center 104 via downlink 120. Typically, the signal transmitted by the transmitter to the satellite has characteristics that are pre-determined (e.g. modulation technique, power).

The video distribution system 100 can comprise a plurality of satellites 108 in order to provide wider terrestrial coverage, to provide additional channels, or to provide additional bandwidth per channel. In one embodiment of the invention, each satellite comprises 16 Ku band transponders to receive and transmit program material and other control data from the uplink center 104 and provide it to the subscribers 110. However, by using data compression and multiplexing techniques the television channel capabilities are far greater. For example, two satellites 108 working together can receive and broadcast over 200 conventional (non-HDTV) television channels via 32 satellite transponders.

While the invention disclosed herein is described with reference to a satellite based digital video distribution system 100, the present invention may also be practiced with terrestrial-based transmission of program information, whether by broadcast, unicast, cable, the Internet, or other means. Further, the different functions collectively allocated among the control center 102 and the uplink center 104 as described above can be reallocated between these facilities as desired without departing from the intended scope of the present invention.

Although the foregoing has been described with respect to an embodiment in which the program material delivered to the subscriber is video (and audio) program material such as a movie, the foregoing method can be used to deliver program material comprising purely audio or purely data, or any combination of information as well.

Figure 2:
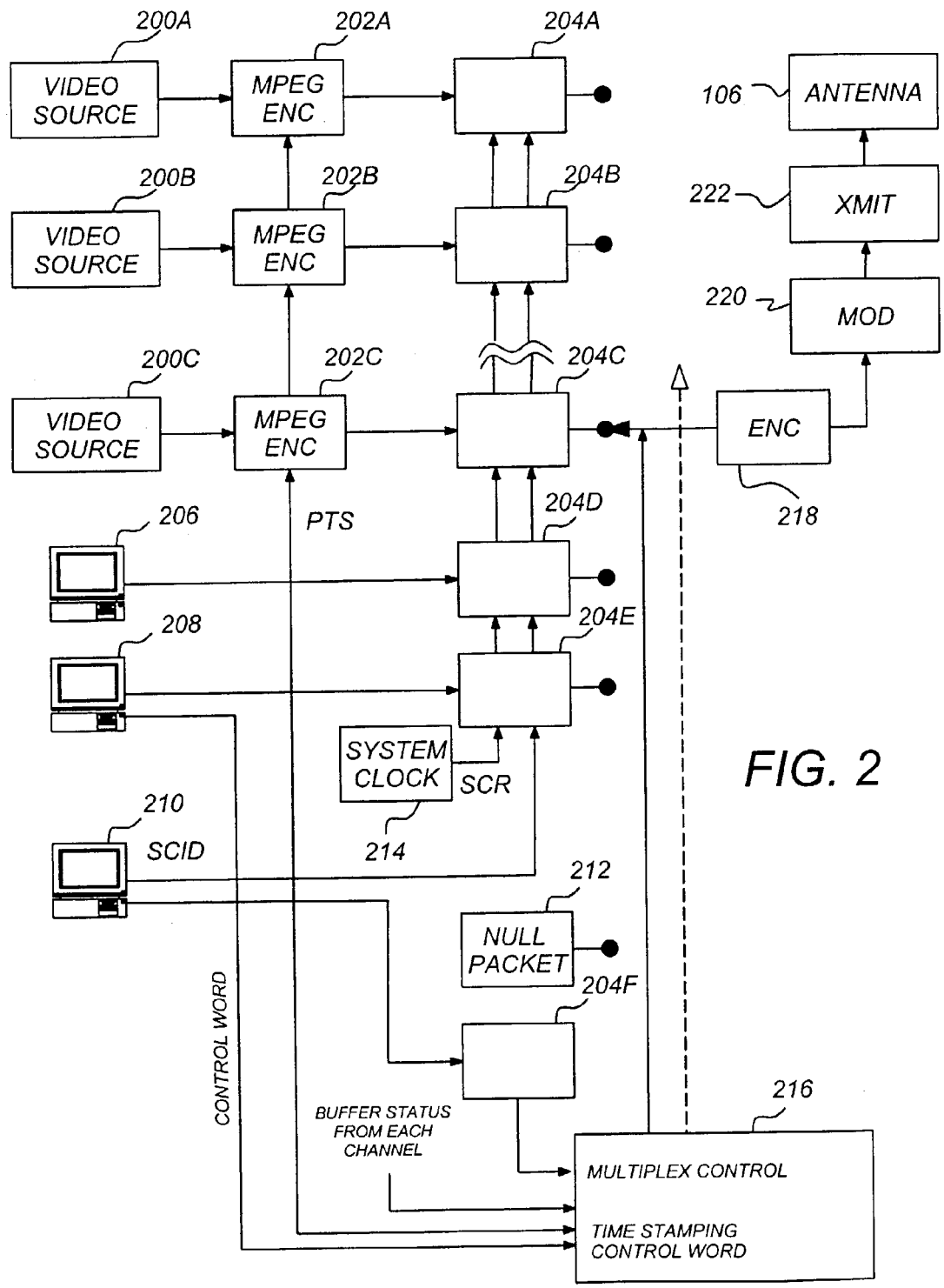
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), a control word (CW) generated by the conditional access manager 208, and a system channel identifier (SCID) 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) (which comprises control data including the control word (CW) and other control data used in support of providing conditional access to the program material) is also encrypted and transmitted.

Figure 3A:
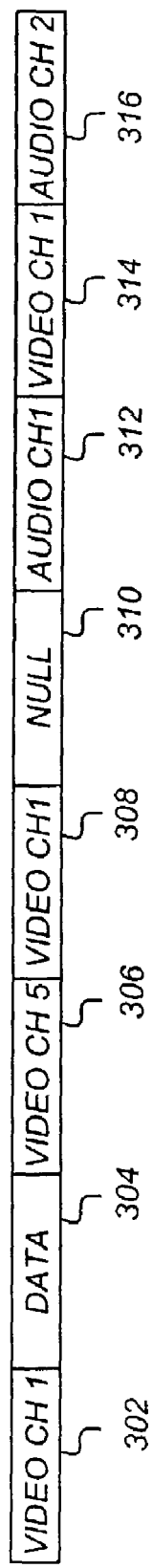
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment 308 includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or integrated receiver/decoder (IRD) 400. Using the SCID, the IRD 400 reassembles the packets to regenerate the program material for each of the channels. As shown in FIG. 3A, null packets 310 created by the null packet module 312 may be inserted into the data stream as desired.

Figure 3B:
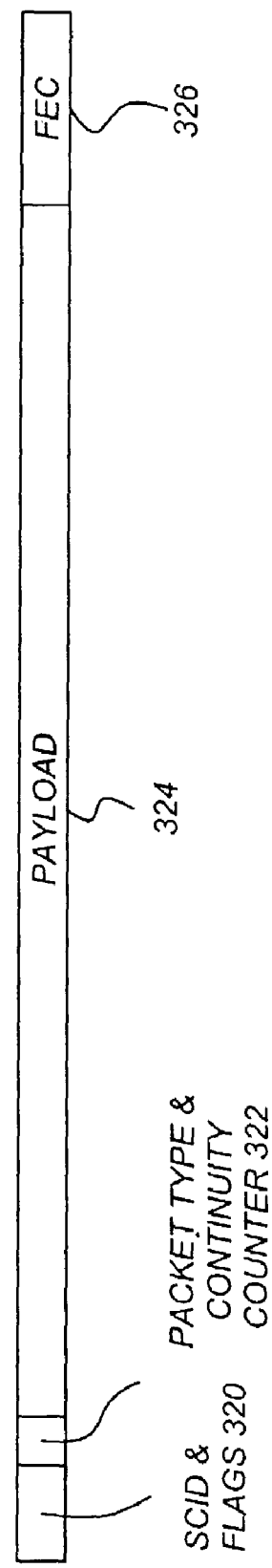
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Subscriber Reception of Media Programs

Figure 4:
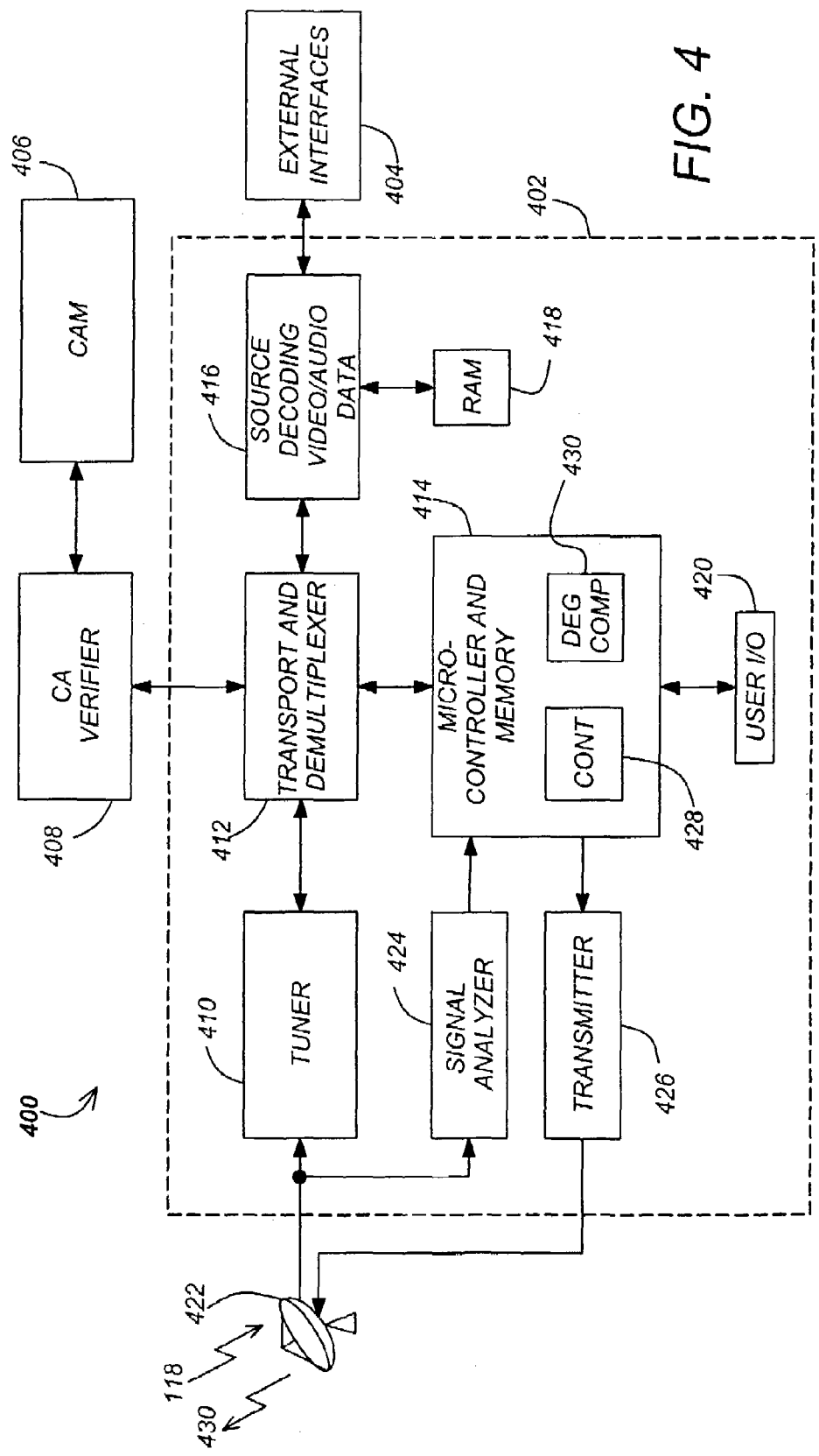
FIG. 4 is a simplified block diagram of one embodiment of a terrestrial receiver.

FIG. 4 is a simplified block diagram of one embodiment of a terrestrial receiver 112 known as an integrated receiver/decoder (IRD) 400. The IRD 400 receives and decrypts the media programs broadcast by the video distribution system 100. These media programs are streamed to the IRD 400 in real time, and may include, for example, video, audio, or data services.

The IRD 400 comprises a receiver/decoder 402, a conditional access verifier (CAV) 408, and a conditional access module (CAM) 406. The CAV 408 and CAM 406 are typically implemented in a smart card or similar device, which is provided to the subscriber 110 to be inserted into the receiver/decoder 402.

The receiver decoder 402 comprises a tuner 410, a transport and demultiplexing module (TDM) 412, which operates under control of a microcontroller and associated memory 414, a source decoder 416 and communicatively coupled random access memory (RAM) 418, and a user I/O device 420 for accepting subscriber 110 commands and for providing output information to the subscriber 110.

The tuner 410 receives the data packets from the video distribution system via the outdoor unit (ODU) 422, which includes a transmit and receive antenna, and provides the packets to the TDM 412. Using the service channel identifiers (SCIDs) associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416, which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions. Further details regarding the operation of the IRD 400 can be found in co-pending and commonly assigned U.S. patent application Ser. No. 09/491,959.

Transmission of Information from the Subscriber to the Satellite

In some circumstances, it is beneficial to permit data to be transmitted from the subscriber 110 ground station 111 to the satellite 108. This capability is useful, for example, to provide Internet access to the subscriber 110 (via a protocol such as TCP/IP) or to transmit other data and information to the control center 102 (e.g. related to the delivery of video/audio programs to the subscriber) or to other entities.

FIG. 4 is a diagram depicting an IRD 400 capable of transmitting information from the subscriber 110 to the satellite 108. This is accomplished with the use of a transmitter 426 communicatively coupled to the microcontroller 414 and the ODU 422. To assure adequate CNR, the IRD 400 uses measurements based on signals received from the satellite 108 to command the transmitter 426 to produce an output signal with a signal characteristic (including, for example, power or modulation technique) that adapts to the measured received signal characteristic.

Figure 5:
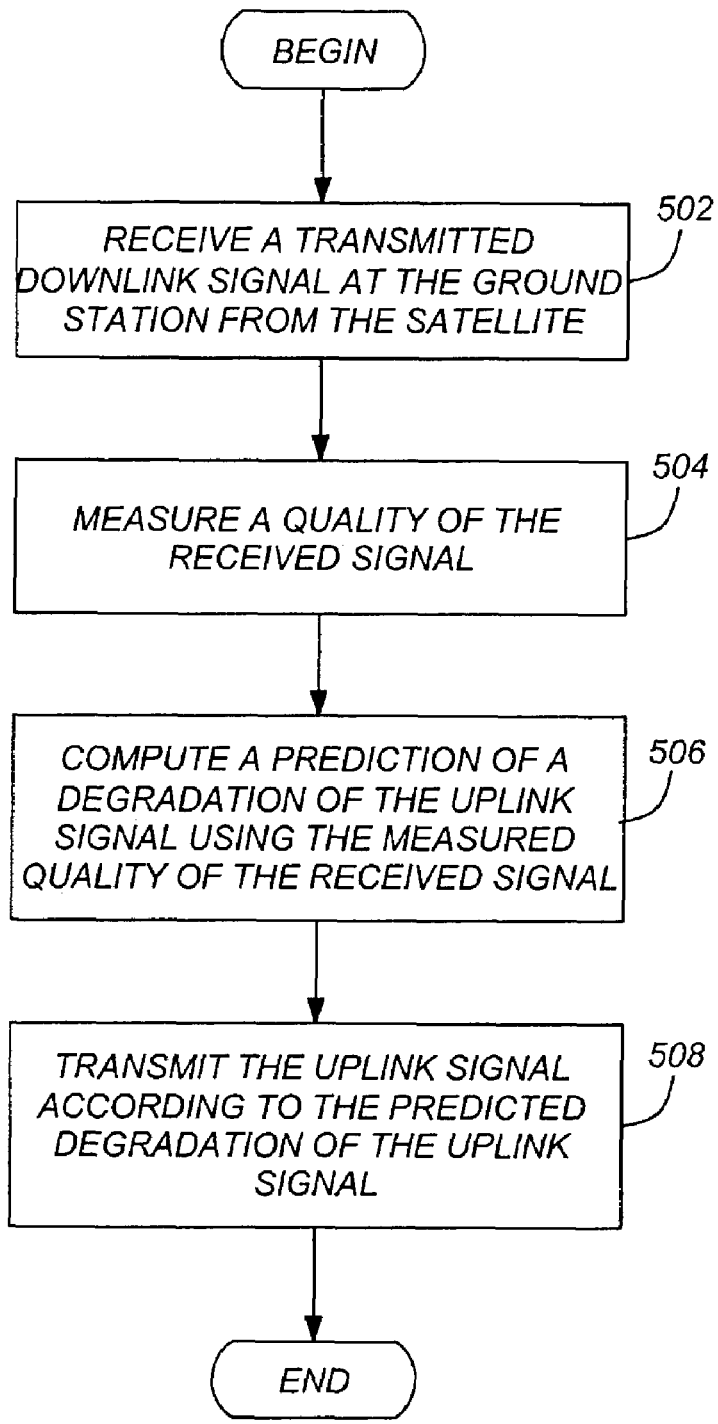
FIG. 5 is a flow chart depicting exemplary method steps used to practice one embodiment of the present invention.

FIG. 5 is a flow chart depicting exemplary method steps used to practice one embodiment of the present invention. A downlink signal 118 is transmitted from the satellite 108, and received by the IRD 400 at the ground station 111, as shown in block 504. A quality of the received signal is then measured, as shown in block 504. The measured quality can be the power of the received signal, the frame error rate, or a measure of the received and detected signal such as the background noise level. In one embodiment, the quality of the received signal is measured with a signal analyzer 424 such as a power meter communicatively coupled to the tuner 410 or the ODU 422.

A prediction of the degradation of the uplink signal is then computed by an uplink degradation prediction module or degradation computer 430, as shown in block 506. The prediction is computed using the measured quality of the received signal. For example, if the power level of the received signal is used as the metric to determine the quality of the received signal, the power level is used to predict or estimate the quality of the uplink signal. In one embodiment of the present invention, the downlink signal 118 may itself include parameters which describe the signal in such terms so as to provide additional data to estimate the degradation of the signal when transmitted from the satellite 108 to the ODU 422 and IRD 402. Such parameters can include, for example, the transmitted power of the downlink signal 118. The uplink signal is then transmitted according to the predicted degradation of the uplink signal 430, as shown in block 508.

Figure 6:
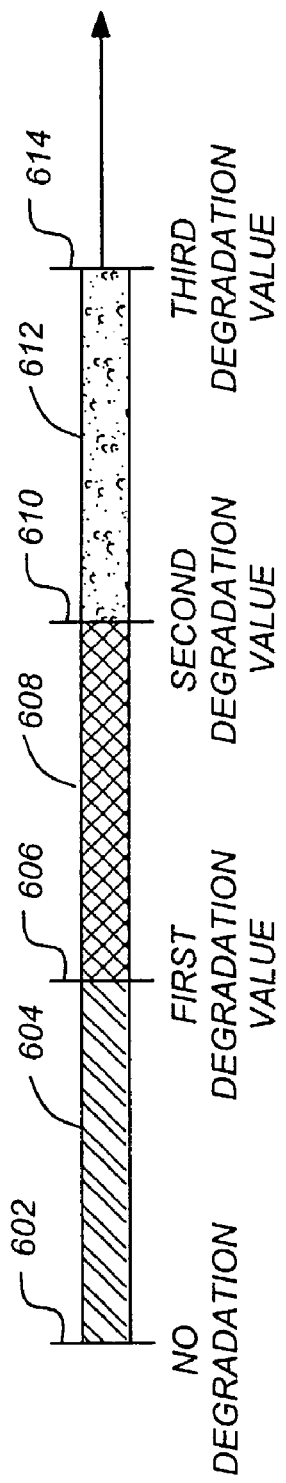
FIG. 6 is a diagram illustrating the application of different predicted degradation values to the present invention.

FIG. 6 is a diagram illustrating the application of different predicted degradation values to the present invention.

Figure 7:
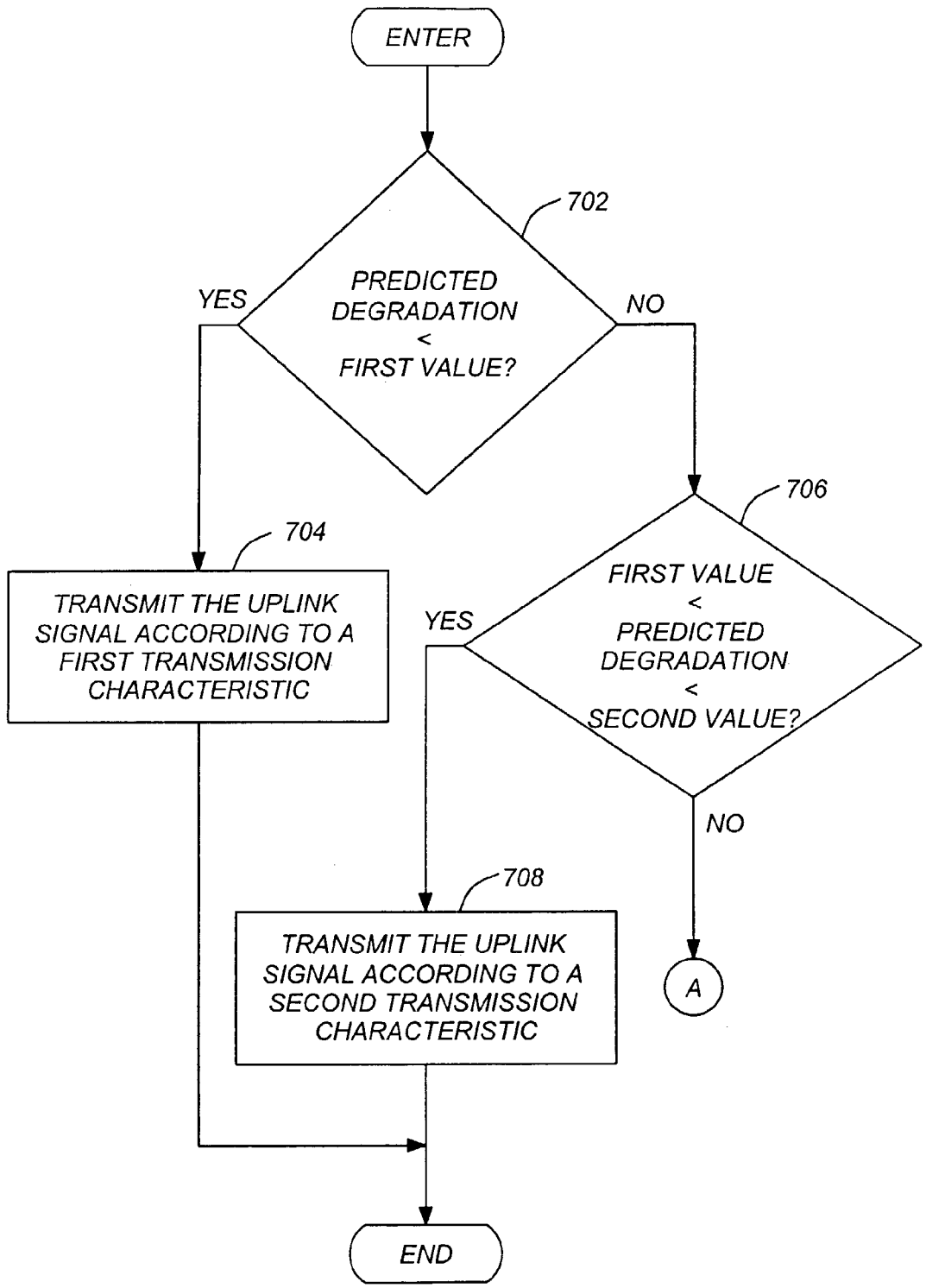
FIG. 7 is a flow chart showing exemplary process steps used to transmit the uplink signal according to the predicted degradation value.

FIG. 7 is a flow chart showing exemplary process steps used to transmit the uplink signal 430 according to the predicted degradation generated in block 506. If the predicted degradation is less than a first degradation value 606 (illustrated in FIG. 6 by the region 604 between the no degradation value 602 and the first degradation value), the uplink signal 430 is transmitted according to a first transmission characteristic, as shown in blocks 702 and 704. If the predicted degradation is greater than the first value and less than a second value (illustrated in FIG. 6 by the region 608 between the first degradation value 606 and the second degradation value 610), the uplink signal 430 is transmitted according to a second transmission characteristic, as shown in blocks 702, 706, and 708.

The first and second transmission characteristics can be selected from a number of characteristics that can be used to describe the transmitted uplink signal 430. In one embodiment, the power of the transmitted uplink signal 430 is varied according to the predicted degradation value. In this embodiment, the first transmission characteristic is a first uplink transmission power, and the second transmission characteristic is a second uplink transmission power.

In another embodiment, the rate of the information transmitted in the uplink signal 430 is varied according to the predicted degradation value. For example, the uplink signal 430 can be modulated according to different modulation schemes, each with different data rates. For example, a phase shift keyed (PSK) modulation scheme may be utilized in the uplink signal 430. PSK modulation schemes include signal constellations with a plurality of signal points arranged in a wide variety of constellations, including QPSK, 8-PSK, and 16-PSK. When such modulation schemes are used, the first modulation scheme can be, for example, a lower data rate modulation scheme such as QPSK, and the higher data rate modulation scheme can include 8 or 16-PSK.

In another embodiment, the error correcting scheme used to code the information can be varied according to the predicted degradation value. Error correcting codes can be characterized by the level of redundancy they introduce into the data stream. Typically, error correcting codes with greater redundancy (and hence permit less data throughput) are also more resistant to errors.

Figure 8:
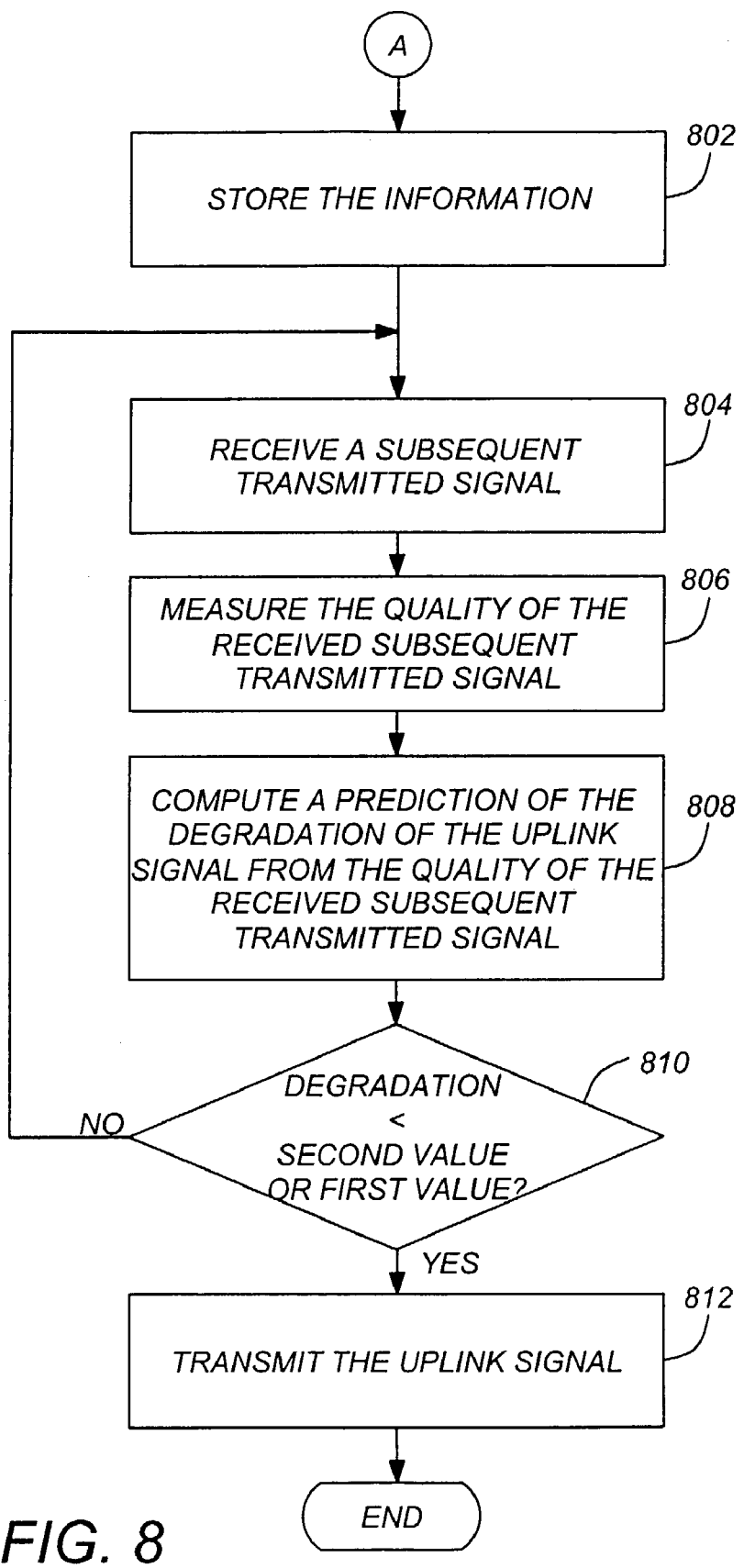
FIG. 8 is flow chart presenting exemplary process steps that are applied when the predicted uplink degradation is sufficient to at least temporarily prevent the transmission of the uplink signal.

FIG. 8 is a flow chart presenting exemplary process steps that are applied (as directed by blocks 702 and 706 of FIG. 7) when the predicted degradation is greater than both the first value 606, and the second value 610 (illustrated in FIG. 6 as region 612 and the region above the third degradation value 614). Typically, when the predicted degradation is greater than the second value 610, the uplink information cannot be reliably transmitted to the satellite 108, even at slower data rates. In this situation, the information to be transmitted is stored for subsequent transmission, as shown in block 802. A signal subsequently transmitted from the satellite 108 to the subscriber 110 is received 804 by the ODU 422 and the IRD 400. The quality of this signal is measured, and this measurement is used to compute an updated prediction of the degradation of the uplink signal 430, as shown in blocks 806 and 808.

In one embodiment, a comparison is made to determine whether the updated prediction of the degradation is less than the first value (thus permitting data transmission at a non-reduced transmission rate). This is illustrated in block 810. If so, the uplink signal 430 is transmitted with the normal transmission characteristic (e.g. data rate or modulation scheme) as shown in block 812. In another embodiment, the comparison determines whether the updated prediction of the degradation is less than the second value (thus permitting data transmission, albeit at a reduced transmission rate). If so, block 812 transmits the uplink information with the second transmission characteristic.

The transmission characteristic of the uplink signal can be selected as a combination of a wide number of different characteristics (e.g. selecting the uplink transmission characteristic based on error correction, data rate, and modulation) or can be selected from a continuous spectrum of choices (e.g. continuously varying uplink transmitter power according to the predicted degradation).

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a system broadcasting downlink signal having a plurality of channels to a plurality of ground stations, each ground station receiving one of the plurality of channels, a method of adaptively transmitting an uplink signal from one of the ground stations to a satellite, comprising the steps of:
   receiving a transmitted downlink signal at the ground station from the satellite;
   measuring a quality of the received signal;
   computing a prediction of a degradation of the uplink signal using the quality of the received signal; and
   transmitting the uplink signal according to the predicted degradation of the uplink signal.

2. The method of claim 1, wherein the step of transmitting the uplink signal according to the predicted degradation of the uplink signal comprises the steps of:
   transmitting the uplink signal according to a first transmission characteristic if the predicted degradation is less than a first value; and
   transmitting the uplink signal at a second transmission characteristic if the predicted degradation is greater than the first value.

3. The method of claim 2, wherein the first transmission characteristic is a first transmission rate and the second transmission characteristic is a second transmission rate less than the first transmission rate.

4. The method of claim 2, wherein the first transmission characteristic is a first transmission modulation scheme and the second transmission characteristic is a second modulation scheme.

5. The method of claim 2, wherein the first transmission characteristic includes a first error correcting scheme, and the second transmission characteristic includes a second error correcting scheme.

6. The method of claim 2, further comprising the steps of:
   determining if the predicted degradation is greater than a second value, wherein the second value is greater than the first value; and
   if the predicted degradation is greater than the second value, performing the steps comprising the steps of:
      (a) storing the information;
      (b) receiving a second transmitted signal;
      (c) measuring a quality of the received second transmitted signal;
      (d) computing a subsequent prediction of the degradation of the uplink signal using the quality of a received second transmitted signal; and
      (e) transmitting the uplink signal including the information after the subsequent prediction of the degradation of the uplink signal is less than the second value.

7. The method of claim 6, further comprising the step of:
repeating step (b) through (d) until the subsequent prediction of the degradation of the uplink signal is less than the second value.

8. The method of claim 6, further comprising the step of:
providing a message to a user indicating that the transmission of the uplink signal will be delayed.

9. The method of claim 2, further comprising the steps of:
determining if the predicted degradation is greater than a second value; and
if the predicted degradation is greater than the second value, performing the steps comprising the steps of:
(a) storing the information;
(b) receiving a second transmitted signal subsequent to the transmitted signal;
(c) measuring a quality of the received second transmitted signal;
(d) computing a subsequent prediction of the degradation of the uplink signal using the quality of the received second transmitted signal; and
(e) informing a user after the subsequent prediction of the degradation of the uplink signal is not greater than the second value.

10. The method of claim 1, wherein the transmission characteristic is selected from the group comprising:
a signal strength; and
a bit error rate.

11. The apparatus of claim 1, wherein:
the controller controls the transmitter to transmit the uplink signal according to a first transmission characteristic if the estimated degradation is less than a first value; and
the controller controls the transmitter to transmit the uplink signal according to a second transmission characteristic if the predicated degradation is greater than the first value.

12. The apparatus of claim 11, wherein the first transmission characteristic is a first transmission rate and the second transmission characteristic is a second transmission rate less than the first transmission rate.

13. The apparatus of claim 11, wherein the first transmission characteristic is a first modulation scheme and the second transmission is a second modulation scheme.

14. The apparatus of claim 13, wherein the first modulation scheme is a QPSK modulation scheme and the second modulation scheme is an n-PSK modulation scheme, wherein n is a positive integer greater than four.

15. The apparatus of claim 13, wherein the first transmission characteristic includes a first error correcting scheme and the second transmission characteristic includes a second error correcting scheme.

16. The apparatus of claim 13, wherein:
the apparatus further comprising a memory; and
the uplink degradation module computes a subsequent prediction of the degradation of the uplink signal using a quality of a received second transmitted signal; and
the controller stores the information in the memory and commands the transmitter to transmit the uplink signal including the stored information after the subsequent prediction of the degradation of the uplink signal is less than the second value.

17. The apparatus of claim 13, wherein
the apparatus further comprises a memory; and
the uplink degradation module computes a subsequent prediction of the degradation of the uplink signal using the quality of a received second transmitted signal; and
the controller stores the information in the memory and informs a user when the subsequent prediction of the degradation of the uplink signal is not greater than the second value.

18. An apparatus for adaptively transmitting an uplink signal comprising information from a ground station to a satellite, comprising:
a tuner for receiving a transmitted downlink signal from the satellite;
a signal analyzer, communicatively coupled to the tuner, for measuring a characteristic of the received downlink signal;
an uplink degradation estimation module, communicatively coupled to the signal analyzer, for estimating a degradation of the uplink signal from the received downlink signal characteristic; and
a controller, communicatively coupled to the uplink degradation module for controlling the transmission of the uplink signal according to the estimated degradation of the uplink signal.

19. The apparatus of claim 18, further comprising a transmitter, communicatively coupled to the controller, for transmitting the uplink signal.

20. The apparatus of claim 18, wherein the signal analyzer is a power meter and the measured characteristic of the received downlink signal is a strength of the received downlink signal.

21. An apparatus for adaptively transmitting an uplink signal comprising information from a ground station to a satellite, comprising:
means for receiving a transmitted downlink signal at the ground station from the satellite;
means for measuring a quality of the received signal;
means for computing a prediction of a degradation of the uplink signal using the quality of the received signal; and
means for transmitting the uplink signal according to the predicted degradation of the uplink signal.

22. The apparatus of claim 21, wherein the means for transmitting the uplink signal according to the predicted degradation of the uplink signal comprises:
means for transmitting the uplink signal according to a first transmission characteristic if the predicted degradation is less than a first value; and
means for transmitting the uplink signal at a second transmission characteristic if the predicted degradation is greater than the first value.

23. The apparatus of claim 22, wherein the first transmission characteristic is a first transmission rate and the second transmission characteristic is a second transmission rate less than the first transmission rate.

24. The apparatus of claim 22, wherein the first transmission characteristic is a first transmission modulation scheme and the second transmission characteristic is a second modulation scheme.

25. The apparatus of claim 22, wherein the first transmission characteristic includes a first error correcting scheme, and the second transmission characteristic includes a second error correcting scheme.

26. The apparatus of claim 22, further comprising:
means for determining if the predicted degradation is greater than a second value, wherein the second value is greater than the first value; and
means for storing the information, receiving a second transmitted signal, measuring a quality of the received second transmitted signal, computing a subsequent prediction of the degradation of the uplink signal using the quality of a received second transmitted signal, and for transmitting the uplink signal including the information after the subsequent prediction of the degradation of the uplink signal is less than the second value.

27. The apparatus of claim 26, further comprising:
means for repeatedly receiving a second transmitted signal and computing a subsequent prediction of the degradation of the uplink signal using the quality of a received second transmitted signal.

28. The apparatus of claim 26, further comprising:
providing a message to a user indicating that the transmission of the uplink signal will be delayed.

29. The apparatus of claim 22, further comprising:
means for determining if the predicted degradation is greater than a second value; and
means for storing the information, for receiving a second transmitted signal subsequent to the transmitted signal, measuring a quality of the received second transmitted signal, for computing a subsequent prediction of the degradation of the uplink signal using the quality of the received second transmitted signal, and for informing a user after the subsequent prediction of the degradation of the uplink signal is not greater than the second value.

30. The apparatus of claim 21, wherein the transmission characteristic is selected from the group comprising:
a signal strength; and
a bit error rate.

* * * * *